(12) United States Patent
Rish et al.

(10) Patent No.: US 7,640,224 B2
(45) Date of Patent: Dec. 29, 2009

(54) ACTIVE SAMPLING COLLABORATIVE PREDICTION METHOD FOR END-TO-END PERFORMANCE PREDICTION

(75) Inventors: Irina Rish, Rye Brook, NY (US); Gerald James Tesauro, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/691,251

(22) Filed: Mar. 26, 2007

(65) Prior Publication Data

US 2008/0243735 A1   Oct. 2, 2008

(51) Int. Cl.
G06F 17/00 (2006.01)
G06N 5/00 (2006.01)
G06N 5/02 (2006.01)

(52) U.S. Cl. .............................. 706/47; 706/45; 706/52
(58) Field of Classification Search .................... 706/47
See application file for complete search history.

(56) References Cited

U.S. PATENT DOCUMENTS

| | | | |
|---|---|---|---|
| 5,704,017 A * | 12/1997 | Heckerman et al. ........... | 706/12 |
| 6,336,108 B1 * | 1/2002 | Thiesson et al. .............. | 706/20 |
| 6,345,265 B1 * | 2/2002 | Thiesson et al. .............. | 706/52 |
| 6,408,290 B1 * | 6/2002 | Thiesson et al. .............. | 706/52 |
| 6,496,816 B1 * | 12/2002 | Thiesson et al. .............. | 706/52 |
| 6,529,891 B1 * | 3/2003 | Heckerman .................. | 706/52 |
| 6,801,909 B2 * | 10/2004 | Delgado et al. ................ | 707/4 |
| 6,807,537 B1 * | 10/2004 | Thiesson et al. .............. | 706/52 |
| 7,389,347 B2 * | 6/2008 | Brodie et al. ................ | 709/224 |

OTHER PUBLICATIONS

Enhanced Content-Based Filtering Using Diverse Collaborative Prediction for Movie Recommendation uddin, Mohammed Nazim; Shrestha, Jenu; Jo, Geun-Sik; Intelligent Information and Database Systems, 2009. ACIIDS 2009. First Asian Conference on Apr. 1-3, 2009 pp. 132-137 Digital Object Identifier 10.1109/ACIIDS.2009.77.*

Weighted nonnegative matrix factorization Yong-Deok Kim; Seungjin Choi; Acoustics, Speech and Signal Processing, 2009. ICASSP 2009. IEEE International Conference on Apr. 19-24, 2009 pp. 1541-1544 Digital Object Identifier 10.1109/ICASSP.2009.4959890.*

(Continued)

*Primary Examiner*—Michael B Holmes
(74) *Attorney, Agent, or Firm*—Scully, Scott, Murphy & Presser, P.C.; Eustus D. Nelson, Esq.

(57) ABSTRACT

Active sample collaborative prediction method, system and program storage device are provided. A method in one aspect may include determining approximation X for matrix Y using collaborative prediction, said matrix Y being sparse initially and representing pairwise measurement values; selecting one or more unobserved entries from said matrix Y representing active samples using said approximation X and an active sample heuristic; obtaining values associated with said unobserved entries; inserting said values to said matrix Y; and repeating the steps of determining, selecting, obtaining and inserting until a predetermined condition is satisfied.

13 Claims, 3 Drawing Sheets

OTHER PUBLICATIONS

Adaptive tracking in distributed wireless sensor networks Lizhi Yang; Chuan Feng; Rozenblit, J.W.; Haiyan Qiao; Engineering of Computer Based Systems, 2006. ECBS 2006. 13th Annual IEEE International Symposium and Workshop on Mar. 27-30, 2006 pp. 9-111 Digital Object Identifier 10.1109/ECBS.2006.20.*

Estimating End-to-End Performance by Collaborative Prediction with Active Sampling Rish, I.; Tesauro, G.; Integrated Network Management, 2007. IM '07. 10th IFIP/IEEE International Symposium on May 21 2007-Yearly 25 2007 pp. 294-303 Digital Object Identifier 10.1109/INM.2007.374794.*

The Impact of the Web Prefetching Architecture on the Limits of Reducing User's Perceived Latency Domenech, J.; Sahuquillo, J.; Gil, J.A.; Pont, A.; Web Intelligence, 2006. WI 2006. IEEE/WIC/ACM International Conference on Dec. 18-22, 2006 pp. 740-744 Digital Object Identifier 10.1109/WI.2006.166.*

Cityscape: civil infostructure technology system for collaborative analysis, prediction, and evaluation Jones et al. Systems, Man, and Cybernetics, 1997. 'Computational Cybernetics and Simulation'., 1997 IEEE International Conference on vol. 3, Oct. 12-15, 1997 pp. 2223-2227 vol. 3 Digital Object Identifier 10.1109/ICSMC.1997.635196.*

* cited by examiner $X = \underset{X}{\mathrm{argmin}}\ Loss\ (X, Y)$

FIG. 1

ACTIVE SAMPLING COLLABORATIVE PREDICTION METHOD FOR END-TO-END PERFORMANCE PREDICTION

FIELD OF THE INVENTION

The present disclosure relates to machine learning approaches and to end-to-end performance estimation.

BACKGROUND OF THE INVENTION

Providing a good quality of service (QoS) to customers is an ultimate objective of any distributed system or network. QoS metrics are typically expressed as end-to-end performance characteristics such as network delay, connection bandwidth, or a round-trip time (RTT) of a transaction (e.g., Web transactions) between a source (e.g., a client) and destination (e.g., a server). Accurate estimates of end-to-end performance are vital to optimizing system performance objectives. For example, in content distribution systems (CDS) one wishes to route download requests to servers (mirror sites) with highest expected bandwidth. In overlay routing, and in distributed hash table (DHT) construction, one is interested in finding lowest-latency routes. A common objective in various kinds of distributed systems is to minimize violations of service-level agreements (SLAs) which typically stipulate penalties if a certain percentage of requests exceed a threshold delay or transaction RTT. In all such applications, it is essential to have accurate information about the end-to-end performance between various end points in the distributed system.

However, estimating end-to-end performance by exhaustive pairwise measurement is infeasible in large networks, and cannot be kept up-to-date in highly dynamic environments. Thus a natural alternative is to try estimating unobserved end-to-end performances from actual, and preferably much smaller, set of available measurements. For example, predicting network latencies has been an active area of research in the past few years, and a variety of approaches have been proposed. A common approach is to embed the network hosts into a low-dimensional Euclidean space based on the previously obtained measurements to a set of landmark nodes. Another approach, called Vivaldi, relies on an analogy with a network of physical strings, and tries to position the hosts so that the potential energy of a spring system is minimized. Finally, matrix-factorization approaches based on Singular Value Decomposition (SVD) and Non-negative Matrix Factorization (NMF), has been recently proposed. While the previous approaches listed above have performed well in interesting scenarios, they face some potentially significant practical limitations. For example, the assumption of Euclidean distance properties (symmetry and triangle inequality) underlying several approaches may often be violated in practice, as observed in various studies. Further, other methodologies are based on a strong assumption, which is shared by many current network distance prediction techniques, even those that avoid Euclidean assumption. Namely, it is assumed that for a given set of landmark nodes, all pairwise measurements among them and between the hosts and the landmark nodes are available. This assumption may not always be realistic, particularly for end-to-end performance measures that are either costly or impossible to obtain on demand, for example, forcing peers in a content-distribution system to upload or download files to all other nodes.

Moreover, it is often observed that the predictive accuracy of collaborative prediction from very sparse data can improve dramatically when more samples become available. However, excessive sampling can be costly. A user may become annoyed if she is asked to rate many products or a network may become congested if too many measurements are performed. Additionally, suggesting a product to buy or a server to download from has a high cost if the user does not like the product, or the download bandwidth turns out to be low. Therefore, there is a need for cost-efficient active sampling that would best improve the performance prediction accuracy while minimizing the sampling costs.

SUMMARY OF THE INVENTION

Method, system and program storage device for active sampling collaborative prediction are provided. A method in one aspect may include determining approximation X for matrix Y using collaborative prediction, said matrix Y being sparse initially and representing pairwise measurement values; selecting one or more unobserved entries from said matrix Y representing active samples using said approximation X and an active sample heuristic; obtaining values associated with said unobserved entries; inserting said values to said matrix Y; and repeating the steps of determining, selecting, obtaining and inserting until a predetermined condition is satisfied.

System and program storage device for performing the above methods are also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 illustrates matrix factorization approach to approximating sparsely observed matrices in one embodiment of the present disclosure.

DETAILED DESCRIPTION

Figure 2:
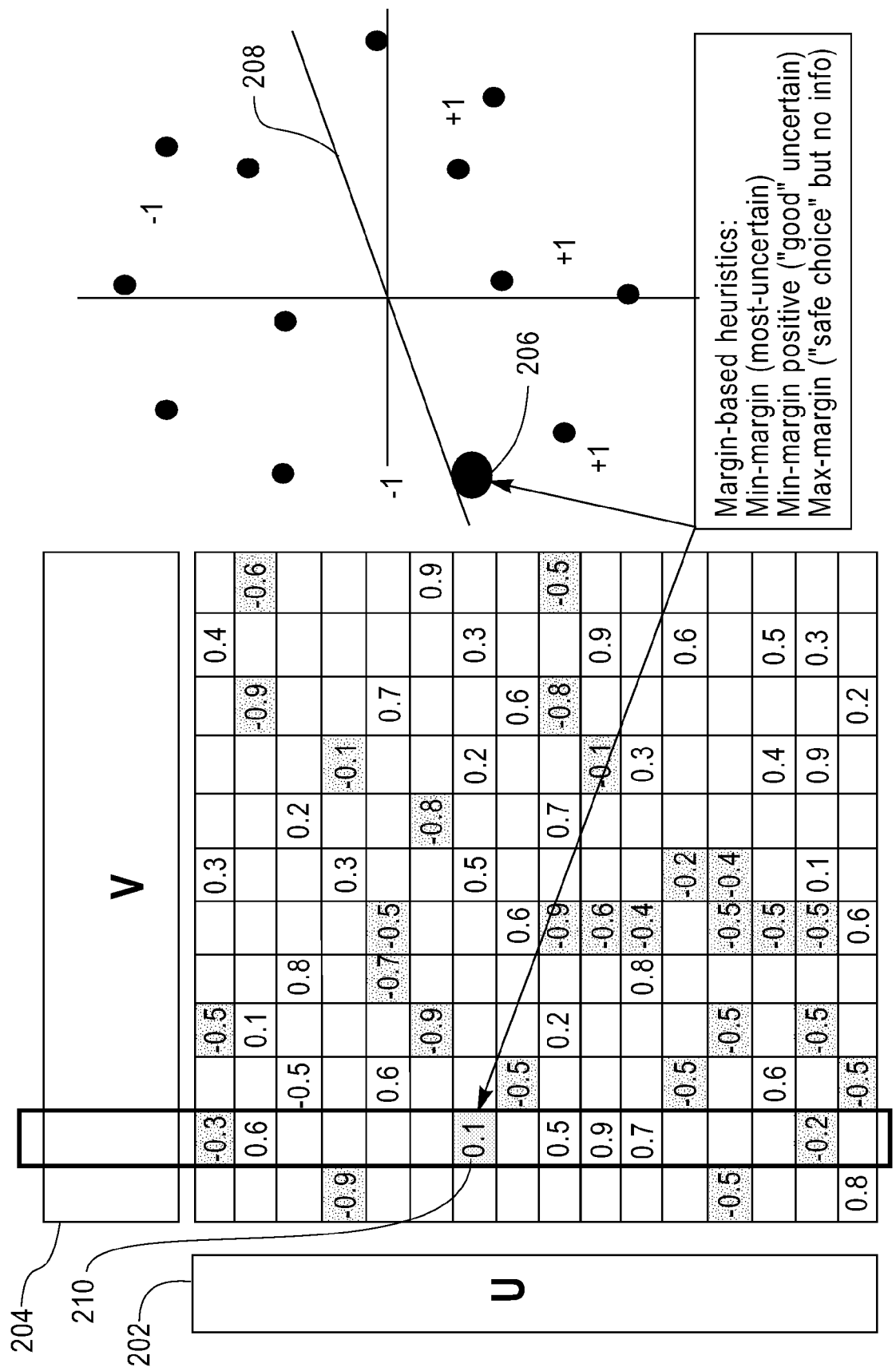
FIG. 2 illustrates a matrix structure representing pairwise metric and the active learning heuristic based on choice of minimum-margin sample in one embodiment of the present disclosure.

Disclosed is a broadly applicable machine-learning approach to end-to-end performance estimation. The estimation, in one embodiment, may be formulated as a collaborative prediction (CP), or sparse matrix approximation problem. Namely, given a large and very sparsely sampled matrix, for example, only a few percent of entries may be observed in some applications, the collaborative prediction problem predicts the unobserved entries from the observed samples, assuming the entries have dependencies across rows and across columns. In one embodiment, the state-of-art matrix factorization method may be combined with active sampling Typical applications of CP may include online recommendation systems that attempt to predict user preferences towards different products, for example, movies, books, etc., based on previously obtained product ratings from other users. In distributed systems management, the method of the present disclosure in one embodiment may be used to predict the end-to-end performance, such as latency or bandwidth, based on a limited number of available measurements between some pairs of nodes. In one embodiment, the CP approach of the present disclosure does not make assumptions about the existence of landmark nodes or about distance properties of underlying measurements. The method of the present disclosure in one embodiment also does not require additional instrumentation or ability to perform specific measurements on demand. However, if such ability is present or given, collaborative prediction of the present disclosure in one embodiment can be enhanced by active sampling, also known as active learning, approaches that select most-informative samples in order to best improve the model accuracy. Thus, in one embodiment, the method of the present disclosure combines collaborative prediction with active learning, which yields significant improvement in predictive accuracy at a lower cost of measurement in several practical applications.

Given a set of users and a set of products, the problem of collaborative prediction is to infer the unknown user's preferences towards different products based on previously observed ratings for different (user, product) pairs. This problem is commonly encountered in online product recommendation systems, but can be generalized to various other applications, where there is a notion of an end-to-end performance metric between elements of the system. For example, given a set of clients (peers that might request a service, such as file download), a set of servers (peers that can provide a service, e.g. have files of interest), and historic data measuring some performance metric for each client-server interaction (e.g., bandwidth), the method of the present disclosure in one embodiment predicts the performance of servers with respect to the given client and chooses the best server. This problem may be simplified by using some aggregate metric for all interactions between a particular client-server pair, and representing the data by a matrix where rows correspond to clients, columns correspond to servers, and the matrix entries represent a metric (e.g., average bandwidth) characterizing the quality, e.g., on the average, of a particular client-server interaction. Note that the matrix can be extremely sparse: e.g., in some of our datasets, less than 1% of the matrix elements may be filled. A similar approach can be used for predicting network delays between pairs of nodes given the delay information between some other pairs.

Formally, a collaborative prediction (CP) problem can be stated as a matrix completion problem—given a partially observed Y, we wish to find a complete (full) matrix X of the same size that best approximates the unobserved entries of Y with respect to a particular loss function (e.g., sum-squared loss for real-valued matrices, misclassification error in case of binary-valued matrices, etc.). An assumption in CP is that the matrix entries are not independent, i.e., there exists shared properties across users and across products, which can be used to generalize from observed to unobserved entries.

A typical assumption underlying various CP techniques is a factorial model in which there are some unobserved "hidden factors" pertaining to users or to products that would affect a particular user's preference toward a particular product. For example, the genre of a movie, or its comedic or offensive language content, may systematically affect whether certain groups of users prefer it. Similarly, two nearby nodes within a large network may share several hidden factors, such as common intermediate nodes on their paths to a third node. There may also be other essentially distance-independent hidden factors, such as machine type and connection type, which may influence a node's quality of service (QoS) regardless of distance to other nodes. For example, a powerful server with a T3 internet connection may be able to consistently deliver high-bandwidth downloads even to very distant clients.

Figure 1:
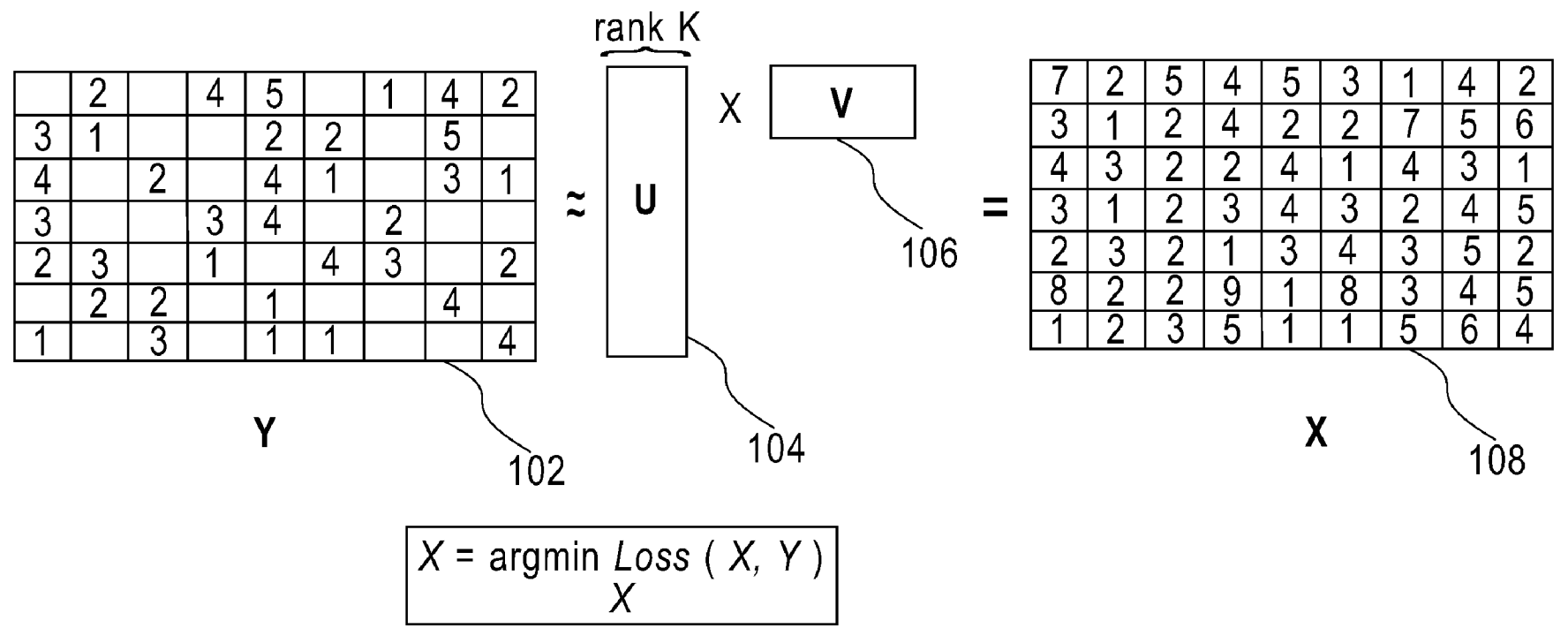

Examples of factorial models are linear factor models where each factor is a preference vector, and actual user's preferences correspond to a weighted linear combination of these factor vectors with user-specific weights. Linear factor models yield a matrix-factorization approach that may be applied to various prior CP problems. Linear factor models may be particularly well-suited for domains such as latency prediction where the end-to-end measurements are additive, i.e., can be decomposed into a (weighted) sum of intermediate delays. FIG. 1 illustrates matrix factorization approach to approximating sparsely observed matrices in one embodiment of the present disclosure. Y 102 represents matrix with sparse observation data. U 104 and V 106 represent two matrices (factors) whose product X 108 provides an approximation of the input matrix Y 102. Various matrix factorization methods search for a pair of such matrices U 104 and V 106 that satisfy particular regularization constraints such as rank (X)<k, while optimizing a particular loss function that describes the quality of approximation of X 108 by the product of U 104 and V 106. Loss functions depend on the nature of the problem. A commonly used loss function is, for example, the sum-squared difference; another loss is based on classification error and its approximations, such as in the MMMF method used below in one embodiment.

Other examples of hidden factor models include but are not limited to various probabilistic models such as MCVQ described in Rong Jin and Luo Si, A Bayesian approach toward active learning for collaborative filtering, in Proc of UAI-04, or Bayesian approach described in D. Ross and R. Zemel, Multiple cause vector quantization, in Proc of NIPS-02. B. Marlin. Collaborative filtering: A machine learning perspective. Master's thesis, University of Toronto, 2004, provides a survey on collaborative prediction methods.

The method of the present disclosure in one embodiment extends the collaborative prediction method, called maximum-margin matrix factorization (MMMF), by combining it with active sampling. MMMF is based on a convex-optimization approach to matrix factorization and is therefore guaranteed to find a globally optimal solution, unlike previous non-convex approaches. MMMF is also more flexible than previously proposed SVD-like matrix-factorization methods for network distance prediction since it can deal with arbitrary sparse matrices, instead of relying on a complete set of measurements associated with fixed landmark nodes. MMMF is described in N. Srebro, J. Rennie, T. Jaakkola, Maximum Margin Matrix Factorizations, in Proc of NIPS-04.

Matrix factorization can be also viewed as a simultaneous learning of feature vectors and linear classifiers in one embodiment as shown in FIG. 2. FIG. 2 illustrates a matrix structure representing pairwise metric. For example, let Y be the original sparsely observed matrix that one is trying to "fill in" (that is, predict its entries) via some approximate matrix X, assuming an approximation is given in the form of factorization X=UV. FIG. 2 shows (a subset of) entries in the matrix X that were unobserved in the input matrix Y and later filled out (predicted) by MMMF. Negative entries correspond to negative class label. Positive entries denotes positive predicted values. The entry shown at 210 correspond to the smallest-absolute value entry in the matrix X, that corresponds to the minimum-margin sample on the right of FIG. 2 (the sample closest to the separating Line between the positive and negative samples). Then the rows of the matrix U 202 can be viewed as a set of feature vectors, while the columns of the matrix V 204 can be viewed as linear classifiers, and the entries of the matrix X are the results of classification using these classifiers. The original entries in the matrix Y can be viewed as labels for the corresponding feature vectors, and the task is to learn simultaneously a collection of feature vectors (rows in U) and a set of linear classifiers (columns in V) from a set of labeled samples (columns in the original matrix Y), such that a good prediction of unobserved entries can be made. A state-of-art in learning linear classifiers is the Support Vector Machines (SVM) approach that attempts to find a linear separator between the examples of two different classes that maximizes the margin (the distance between the line and the closest example). SVM approach has theoretical guarantees regarding the generalization error, and typically performs very well in practice, and is popular in the machine-learning community.

The method of the present disclosure proposes a novel algorithm that further augments collaborative prediction approaches, for example, MMMF, with active sampling and yields considerable improvements in accuracy versus its passive baseline. Active sampling may be applied to applications, in which there are choices of different actions that can be taken based on a new measurement. For example, in Internet distance prediction application, one can decide to measure a distance between a particular pair of nodes; in content distribution systems, a particular mirror site needs to be selected to satisfy a file request which also leads to an additional bandwidth measurement; in an online recommendation system, one can choose a product to suggest to the current user; etc. Such additional measurements can greatly improve the predictive accuracy of a model, but they may also have a cost (e.g., potentially low bandwidth or high network latency if a poor server is selected). On one hand, we wish to choose the next sample which is most-informative and leads to greatest improvement in future predictive accuracy (i.e., yields better exploration), while on the other hand we want to avoid choosing samples which might be too costly by exploiting our current predictions about the sample costs (i.e., the corresponding predicted performance). The present disclosure in one embodiment considers such exploration versus exploitation trade-offs are considered as a part of a decision-making.

In one embodiment, the method of the present disclosure may exploit the relation between MMMF and SVM classifiers to extend MMMF using margin-based active-learning heuristics, where the margin is used to estimate informativeness of a candidate sample. A similar approach can be applied to any CP method that outputs the confidence of its prediction, such as margin or probability. For example, a probabilistic model that outputs the probability of the prediction can replace MMMF's prediction. MCVQ is described in Rong Jin and Luo Si, A Bayesian approach toward active learning for collaborative filtering, in Proc of UAI-04. Bayesian approach is described in D. Ross and R. Zemel, Multiple cause vector quantization, in Proc of NIPS-02. B. Marlin. Collaborative filtering: A machine learning perspective. Master's thesis, University of Toronto, 2004, provides a survey on collaborative prediction methods.

The active approach method of the present disclosure in one embodiment allows a flexible trade-off between the exploration goal of choosing an active sample to learn more about unexplored connections, for example, between the nodes to improve the model accuracy in the future, and the exploitation goal of choosing the server with highest expected performance for a given service request, particularly in content-distribution systems. FIG. 2 illustrates an example active sampling heuristics, the minimum-margin heuristic, which selects an unlabeled sample 206 closest to the current separating line 208 (hyperplane in general high-dimensional space) and requests its label. This corresponds to choosing most-uncertain sample; in context of SVMs such method was previously proposed by S. Tong and D. Koller, Support Vector Machine Active Learning with Applications to Text Classification, in Proc of ICML 2000. In general, uncertainty sampling can be based on any measure of confidence, such as probability, and the most-uncertain sample will be the one for which the predicted class label distribution is closest to uniform. However, any other active sampling heuristic or methodology, beyond uncertainty sampling, may be used in the method and system of the present disclosure. For example, less "aggressive" strategy may be applied that takes into account possible sampling costs and may decide to be more "conservative" about sample choice. For example, when sampling also means providing a service such as file download, besides improving the future prediction accuracy, the method and system of the present disclosure may take into consideration the immediate cost of sampling (e.g., a poor-quality connection and long download time can have a cost). Within binary prediction framework of the present disclosure, it may be assumed that positive samples (e.g., high bandwidth or low latency) have less cost than negative samples. On this basis the method and system of the present disclosure can additionally explore two cost-sensitive active learning heuristics: a most-uncertain-positive heuristic that chooses the minimum-margin sample from among samples currently predicted to be positive, as well as a least-uncertain-positive heuristic, which corresponds to a purely "greedy" strategy of trying to choose the sample with least expected cost.

Figure 3:
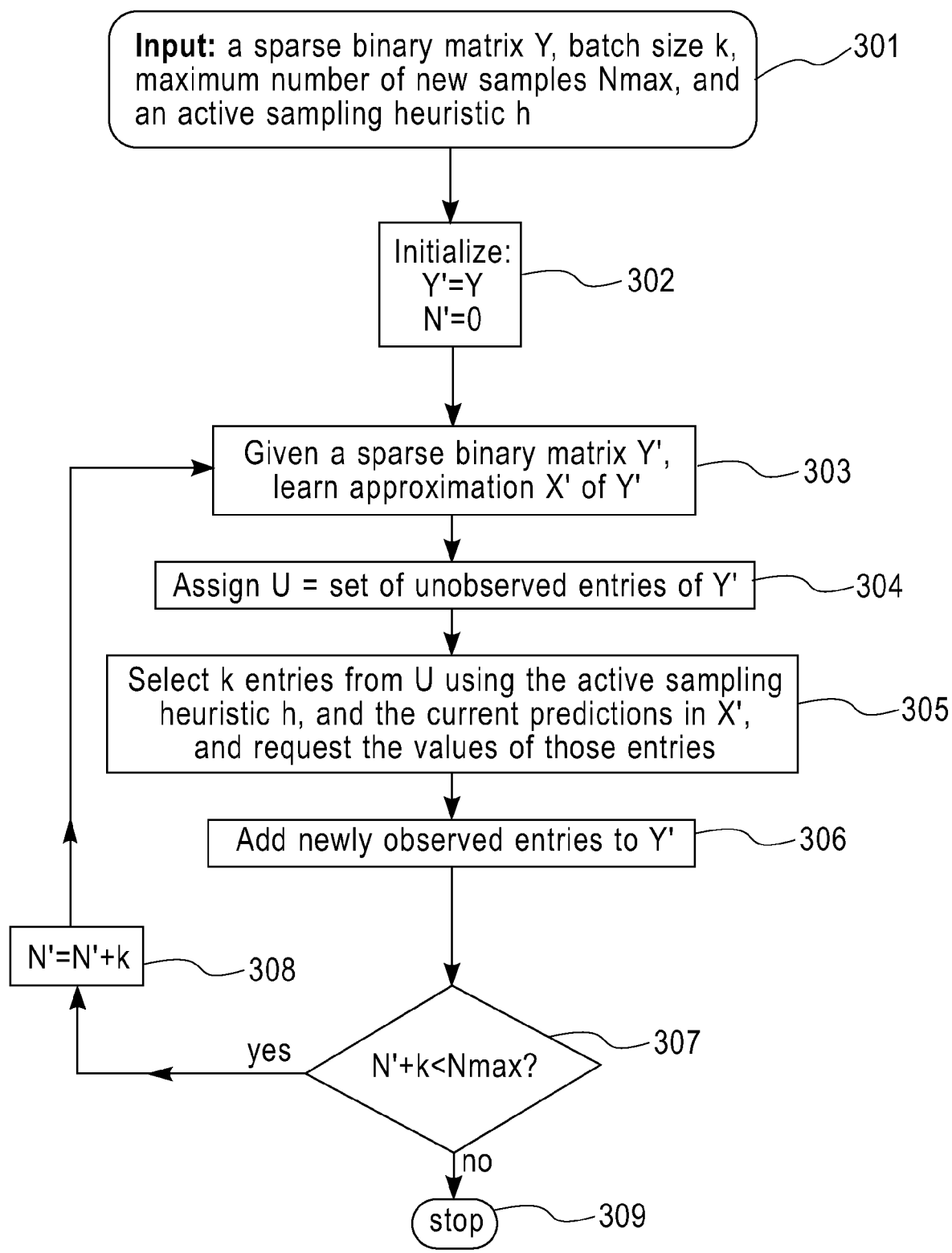
FIG. 3 is a flow diagram illustrating an active collaborative prediction method of the present disclosure in one embodiment.

FIG. 3 is a flow diagram illustrating an active collaborative prediction method of the present disclosure in one embodiment. An example collaborative prediction approach illustrated is MMMF, hence active-MMMF (A-MMMF). However, any other collaborative prediction approach that outputs a confidence value for each predicted label, besides the prediction itself, can be used, as mentioned above. The algorithm takes as an input (301) a sparse binary matrix Y, and several parameters of the algorithm such as a batch size k, maximum number of new samples Nmax, and an active-sampling heuristic (e.g., one of the examples described above or any other active sampling heuristic). At 302, an initialization step is performed. At 303, an approximation X' is computed using MMMF for a given sparse matrix Y'. At 304, a set of unobserved entries in Y' is assigned to a set U. At 305, using current predictions (sign of X(i,j) predict unseen Y(i,j)), and a particular active sampling heuristic provided as an input to the algorithm, select k unobserved entries from U (active samples) and request their values (labels). At 306, add new entries to Y. At 307, check if the current total number of requested active samples (requested values of previously unseen entries in the matrix Y') reaches or exceeds the bound Nmax; if the bound is reached, stop at 309, otherwise augment N' by k at 308 and go back to step 303. When using a different collaborative prediction method than MMMF, for example a probabilistic predictor, a slight modification of the above procedure may be needed, that is, at 305, the method may use the current confidence (probability) of prediction to select the active sample: for example, most-uncertain sample will be the one corresponding to the closest to uniform probability distribution of the label (i.e., the class label −1 and 1 have probabilities close to 0.5).

The system and method of the present disclosure may be implemented and run on a general-purpose computer or computer system. The system and method of the present disclosure may be also implemented and run on a specialized computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. An active sampling collaborative prediction method, comprising:
   determining approximation X for matrix Y using collaborative prediction, said matrix Y being sparse initially and representing pairwise measurement values;
   selecting one or more unobserved entries from said matrix Y representing active samples using said approximation X and an active sample heuristic;
   obtaining values associated with said unobserved entries;
   inserting said values to said matrix Y; and
   repeating the steps of determining, selecting, obtaining and inserting until a predetermined condition is satisfied.

2. The method of claim 1, wherein the collaborative prediction method is a matrix factorization method.

3. The method of claim 2, wherein the matrix factorization method is MMMF.

4. The method of claim 1, wherein said method is used to determine end-to-end performance prediction.

5. The method of claim 1, wherein the active sample heuristic comprises margin-based sampling.

6. A program storage device readable by a machine, tangibly embodying a program of instructions executable by the machine to perform an active sampling collaborative prediction method for end-to-end performance prediction, comprising:
   determining approximation X for matrix Y using collaborative prediction, said matrix Y being sparse initially and representing pairwise measurement values;
   selecting one or more unobserved entries from said matrix Y representing active samples using said approximation X and an active sample heuristic;
   obtaining values associated with said unobserved entries;
   inserting said values to said matrix Y; and
   repeating the steps of determining, selecting, obtaining and inserting until a predetermined condition is satisfied.

7. The program storage device of claim 6, wherein the collaborative prediction method is a matrix factorization method.

8. The program storage device of claim 7, wherein the matrix factorization method is MMMF.

9. The program storage device of claim 6, wherein the active sample heuristic comprises margin-based sampling.

10. A system for performing an active sampling collaborative prediction method for end-to-end performance prediction, comprising:
    means for determining approximation X for matrix Y using collaborative prediction, said matrix Y being sparse initially and representing pairwise measurement values;
    means for selecting one or more unobserved entries from said matrix Y representing active samples using said approximation X and an active sample heuristic;
    means for obtaining values associated with said unobserved entries;
    means for inserting said values to said matrix Y; and
    means for repeating the steps of determining, selecting, obtaining and inserting until a predetermined condition is satisfied.

11. The system of claim 10, wherein the collaborative prediction method is a matrix factorization method.

12. The system of claim 10, wherein the matrix factorization method is MMMF.

13. The system of claim 10, wherein the active sample heuristic comprises margin-based sampling.

* * * * *